United States Patent
Parcell

(10) Patent No.: US 9,706,762 B2
(45) Date of Patent: *Jul. 18, 2017

(54) DIVERTER CONE DEVICE

(71) Applicant: Steven Parcell, Milford, OH (US)

(72) Inventor: Steven Parcell, Milford, OH (US)

(73) Assignee: Steve Parcell

(*) Notice: Subject to any disclaimer, the term of this patent is extended or adjusted under 35 U.S.C. 154(b) by 197 days.

This patent is subject to a terminal disclaimer.

(21) Appl. No.: 14/607,368

(22) Filed: Jan. 28, 2015

(65) Prior Publication Data

US 2015/0150230 A1 Jun. 4, 2015

Related U.S. Application Data

(63) Continuation of application No. 12/631,421, filed on Dec. 4, 2009, now Pat. No. 8,943,738.

(51) Int. Cl.
*A01K 85/02* (2006.01)
*A01K 85/12* (2006.01)
*A01K 91/06* (2006.01)
*A01K 97/00* (2006.01)
*A01K 99/00* (2006.01)

(52) U.S. Cl.
CPC ............. *A01K 97/00* (2013.01); *A01K 85/02* (2013.01); *A01K 85/12* (2013.01); *A01K 91/06* (2013.01); *A01K 99/00* (2013.01)

(58) Field of Classification Search
CPC .......... A01K 85/02; A01K 85/12; A01K 91/06
USPC ........ 43/41, 41.2, 42.08, 42.4, 42.41, 42.46, 43/42.7, 43.1, 43.12, 44.87, 44.88, 44.9, 43/44.92, 44.97
See application file for complete search history.

(56) References Cited

U.S. PATENT DOCUMENTS

| | | |
|---|---|---|
| 1,313,567 A | 8/1919 | Ulrich |
| 2,140,724 A | 12/1938 | Stefan |
| 2,241,367 A | 5/1941 | Sarff |
| 2,292,743 A | 8/1942 | Cordry |
| 2,804,713 A | 9/1957 | Johnson |
| 2,926,452 A | 3/1960 | Lewis |
| 2,977,707 A | 4/1961 | Dreher |
| 3,151,413 A | 10/1964 | Witz |
| 3,170,756 A | 2/1965 | Butler |

(Continued)

OTHER PUBLICATIONS

Cabela's Inc., World Famous Outfitter, 2008 Catalog, 4 pp.

*Primary Examiner* — David Parsley
(74) *Attorney, Agent, or Firm* — Wood Herron & Evans LLP

(57) ABSTRACT

The present invention relates to a fishing rig having a fishing line, a fixture, a conical diverter and a hooking device. The conical diverter has a cylindrical wall portion that is contiguous with and extends from a conically-shaped wall portion having an aperture in the narrow end that allows the fishing line to pass through. The aperture has a diameter that is larger than a thickness of the line and smaller than a width of the fixture, which is attached to the line. The line passes through the aperture so that when the fishing rig is pulled through water, the fixture is positioned inside the conical diverter and prevents the narrow end of the conical diverter from traversing the line toward the hooking device beyond the fixture, thereby allowing the conical diverter to be pulled through the water ahead of and spaced from the hooking device.

20 Claims, 3 Drawing Sheets

(56) References Cited

U.S. PATENT DOCUMENTS

| | | | |
|---|---|---|---|
| 3,535,815 A * | 10/1970 | Lowndes | A01K 91/053 43/43.12 |
| 3,667,151 A | 6/1972 | Lamb | |
| 3,670,447 A | 6/1972 | Wohead | |
| 3,722,128 A | 3/1973 | Tremblay | |
| 3,888,036 A | 6/1975 | Wallace | |
| 3,953,934 A | 5/1976 | Visser | |
| 3,987,576 A | 10/1976 | Strader | |
| 4,139,964 A | 2/1979 | Pelletier | |
| 4,217,721 A | 8/1980 | Hershberger | |
| 4,649,662 A | 3/1987 | Tharp et al. | |
| 4,858,367 A | 8/1989 | Rabideau | |
| 4,969,287 A | 11/1990 | Johnson | |
| 5,020,267 A * | 6/1991 | Rasmussen | A01K 91/08 43/42.5 |
| 5,040,325 A | 8/1991 | Herrmann | |
| 5,319,876 A | 6/1994 | Vlahek | |
| 5,661,922 A | 9/1997 | Bonomo | |
| 5,666,760 A | 9/1997 | Bramblett et al. | |
| 5,960,579 A | 10/1999 | Hampton | |
| 6,658,785 B1 | 12/2003 | Faulkner et al. | |
| 6,993,866 B1 | 2/2006 | Strange | |
| 8,544,455 B1 | 10/2013 | Bruington | |

\* cited by examiner

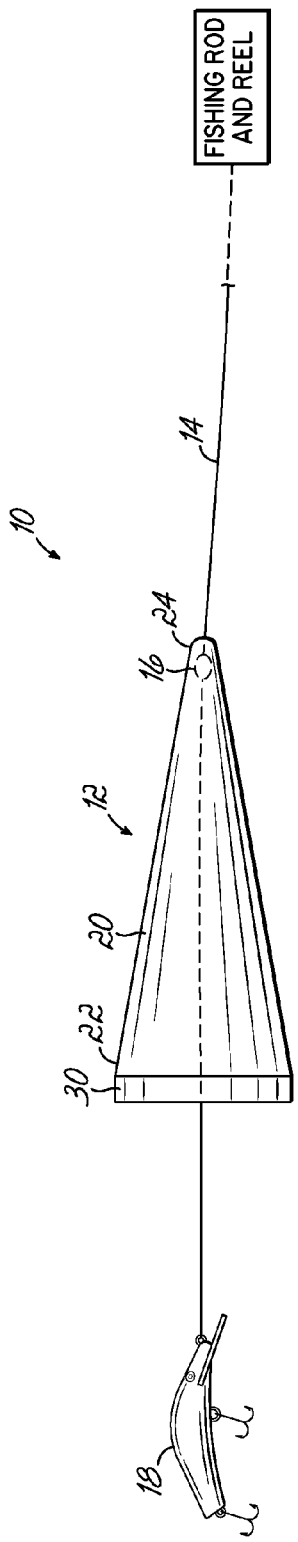
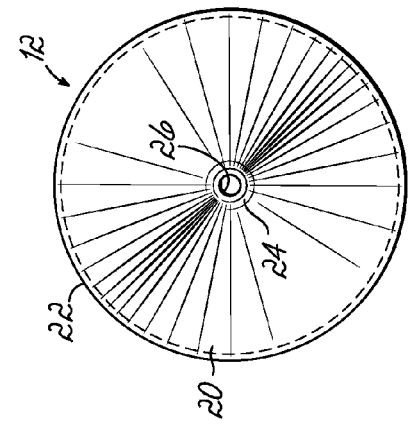
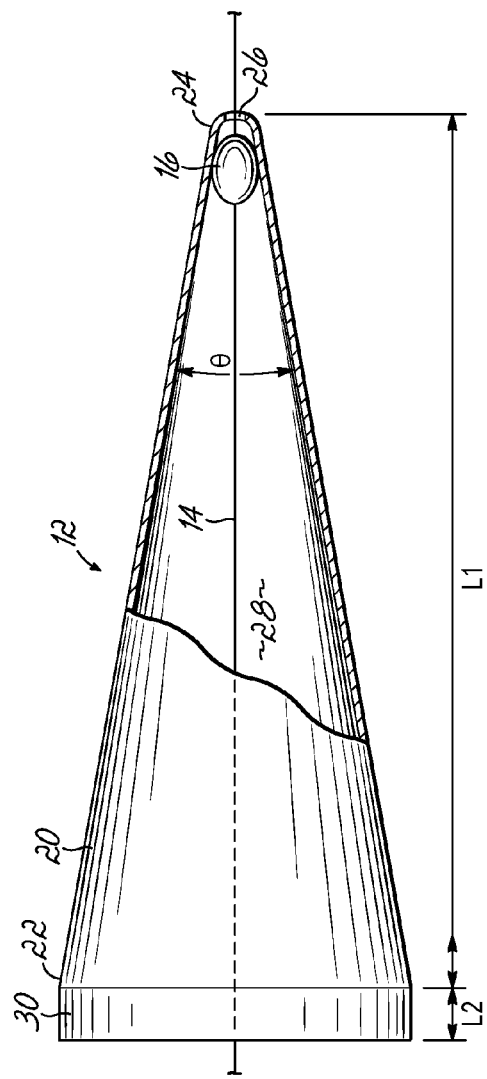
FIG. 1
FIG. 2
FIG. 3

DIVERTER CONE DEVICE

RELATED APPLICATION

This application is a continuation of co-pending U.S. application Ser. No. 12/631,421, filed Dec. 4, 2009, the disclosure of which is incorporated herein by reference in its entirety.

FIELD OF INVENTION

The present invention relates generally to a fishing apparatus and, in particular, to a device to minimize hook snags.

BACKGROUND OF INVENTION

Fishing hooks are functionally designed to hook into the mouth of a fish, but they are not generally designed to discriminate between fish and any vegetation matter that may be present in the body of water being fished, be it a river, a pond, a lake or an ocean. A common problem when fishing in any high vegetation area is the repeated snagging of living or dead plant matter on the fish hook device. The accumulation of plant matter may inhibit or mask the capacity of the fish hook device to catch a fish, or may even produce a false signal of a fish strike. Moreover, loss of the fish hook device and other fishing gear can result if the snag is sufficiently secure. Therefore, a need exists to protect a fish hook device from undesirable snagging, while still maintaining the availability of the fish hook device for fish to strike.

SUMMARY OF THE INVENTION

In one embodiment of the invention, a fishing rig is provided that comprises a line having a pole end, a hook end, and a fixture fastened to the line there between; a conical diverter comprising a conically-shaped wall having a wide end and a narrow end, wherein an aperture in the narrow end has a diameter that is greater than a thickness of the line and smaller than a width of the fixture, and a cylindrical wall that is contiguous with and extending from the wide end of the conically-shaped wall; and a hooking device fastened to the hook end of the line. The pole end of the line passes through the aperture of the conical diverter so that when the fishing rig is pulled through water, the fixture is positioned inside a volume defined by the walls of the conical diverter and prevents the narrow end of the conical diverter from traversing the line toward the hooking device beyond the fixture, thereby allowing the conical diverter to be pulled through the water ahead of and spaced apart from the hooking device.

In another embodiment of the invention, a fishing rig is provided that comprises a line having a pole end and a hook end; a fixture fastened to the line between the pole end and the hook end; a conical diverter comprising a conically-shaped wall having a wide end and a narrow end, and a cylindrical wall that is contiguous with and extends from the wide end of the conically-shaped wall, wherein the walls define a hollow cavity. The narrow end of the conically-shaped wall comprises a frusto-conical portion having a generally cylindrical channel which defines an aperture having a diameter that is larger than a thickness of the line and smaller than a width of the fixture, the frusto-conical portion extending toward the wide end a sufficient distance whereby a cavity diameter of the hollow cavity adjacent the frusto-conical portion is larger than a diameter of the fixture; and a hooking device fastened to the hook end of the line. The pole end of the line passes through the aperture so that when the fishing rig is pulled through the water, the fixture is inside the hollow cavity and prevents the narrow end of the conical diverter from traversing the line toward the hooking device beyond the fixture, allowing the conical diverter to be pulled through the water ahead of and spaced from the hooking device. In one embodiment, the outermost dimensions of the fixture do not contact the inner wall defining the hollow cavity adjacent the frusto-conical portion.

BRIEF DESCRIPTION OF THE DRAWINGS

The accompanying drawings, which are incorporated in and constitute a part of this specification, illustrate embodiments of the invention and, together with the brief description given above and a detailed description of the embodiments given below, serve to explain the principles of the embodiments of the invention.

FIG. 1 is a side elevational view of a fishing rig according to one embodiment of the invention.

FIG. 2 is a side elevational view shown in partial cross-section of a conical diverter according to one embodiment of the invention.

FIG. 3 is an end perspective view taken from the narrow end of the conical diverter shown in FIG. 2.

DETAILED DESCRIPTION OF THE INVENTION

Figure 4:
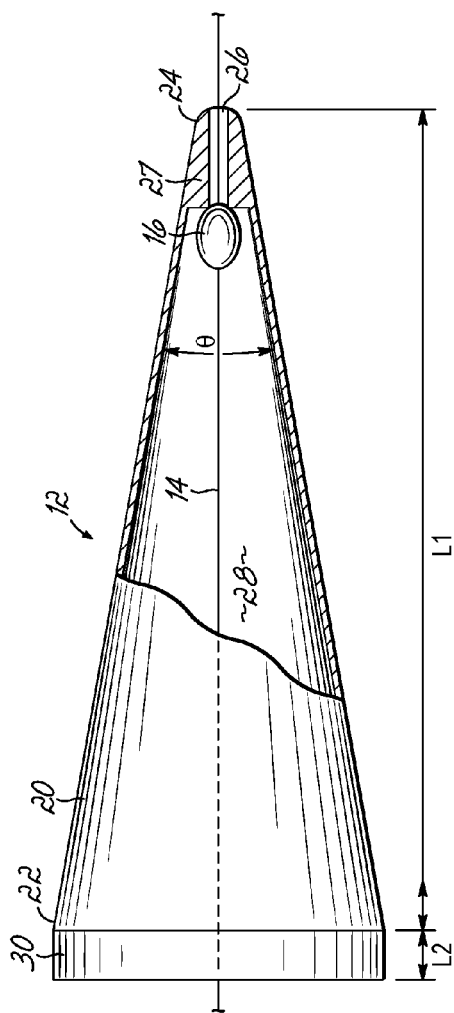
FIG. 4 is a side elevational view shown in partial cross-section of a conical diverter according to another embodiment of the invention.

The present invention is directed to a fishing rig 10, which can prevent or minimize the snagging of a hooking device 18. In reference to FIGS. 1-10, the fishing rig 10 comprises a conical diverter 12, a line 14, a fixture 16, and a hooking device 18, and may further include a fishing reel, and a fishing pole or rod, which are shown in a labeled box (FIG. 1). The conical diverter 12 is comprised of a conically-shaped wall section and a cylindrical wall section, and optionally external fins.

The conical diverter 12 may be comprised of any suitable material, such as a thermosetting or thermoplastic polymeric material. Exemplary polymeric materials may include thermoplastic materials such as polycarbonate, polyvinylchloride, nylon, polyethylene, polyethylene terephthalate, polypropylene, polypropylene terephthalate, polybutylene, polybutylene terephthalate, polymethyl methacrylate, polystyrene, and mixtures thereof.

In one embodiment, the conical diverter 12 is comprised of a polymeric material that is substantially transparent to light. Furthermore, the polymeric material may be substantially colorless or it may further comprise a tinting agent to provide color to the conical diverter 12. The polymeric material may further comprise other commonly used additives, such as fillers and stabilizers. One consideration for the final polymeric composition is to provide a conical diverter 12 having a specific gravity of about equal to or greater than 1.

The polymeric material may be molded to form the conical diverter 12. For example, the conical diverter 12, as a single continuous body, may be obtained by injection molding of a thermoplastic polymer or thermoplastic resin composition in a single mold. Alternatively, a conically-shaped wall 20 section, a cylindrical wall 30 section, and an optional external fin 40 may be molded separately or in any combination thereof, and subsequently attached together by any suitable means. For example, the sections and fins may be joined by an adhesive or fused together. Alternatively, the sections may be reversibly coupled together. Any suitable means may be used. For example, complementary male and female portions may be used. Additionally, the external fins 40 may be reversibly attached to the conical diverter 12 to allow interchangeability of different sized or shaped fins. For example, the fins 40 may further comprise tabs that fit into slots on the conical diverter 12.

It is envisioned that the conically-shaped wall 20 may generally conform to the slope of a right cone. Yet in another embodiment, the conically-shaped wall 20 may generally conform to that of an oblique cone. In other words, the embodiments described herein are not restricted to any geometrically rigorous shape, but instead accommodate minor variances. Notwithstanding the foregoing, the following discussion will generally be directed to a right cone embodiment of a conically-shaped wall 20, but the principles discussed herein are applicable to any conically-shaped wall.

The conically-shaped wall 20 is comprised of a wide end 22 and a narrow end 24, wherein an aperture 26 in the narrow end 24 is present to enable a line 14 to pass through the narrow end 24 and into a hollow cavity 28. To accommodate the line 14, the aperture 26 in the narrow end 24 has a diameter that is greater than the thickness of the line 14. To prevent the narrow end 24 from traversing the line 14 in the direction of a hooking device 18, the aperture 26 has a diameter that is smaller than the width of a fixture 16 fastened to the line 14. For example, the aperture diameter range may be about 1.5 mm (0.06 inches) to about 5 mm (0.2 inches). The aperture diameter may be about 3 mm (0.125 inches).

In the simplest form, the aperture 26 may comprise a hole in the wall thickness at the narrow end 24. Another alternative embodiment contemplates the aperture extending from the narrow end 24 toward the wide end 22 along a generally cylindrical channel within the volume, i.e., the hollow cavity 28, defined by the conically-shaped wall 20. For example, the narrow end 24 may comprise a frusto-conical portion 27 having a generally cylindrical channel thereby defining an aperture 26 having a diameter that is larger than a thickness of the line 14 and smaller than a width of the fixture 16, the frusto-conical portion 27 extending toward the wide end 22 a sufficient distance whereby a cavity diameter of the hollow cavity 28 is larger than a diameter of the fixture 16 (FIG. 4).

The thickness of the conically-shaped wall 20 may range from about 0.5 mm (about 0.02 inches) to about 2.5 mm (about 0.1 inches). For example, the thickness may range from about 0.8 mm (about 0.03 inches) to about 1.3 mm (about 0.05 inches). In yet another example, the thickness of the conically-shaped wall 20 may be about 1 mm (about 0.04 inches).

Moreover, the conically-shaped wall 20 may have a cone angle θ of about 15 degrees to about 40 degrees. For example, the cone angle θ may be about 20 degrees.

The cylindrical wall 30 section is contiguous with and extends from the wide end 22 of the conically-shaped wall 20. In one embodiment the cylindrical wall 30 section may have a generally circular cross-section. In an alternative embodiment, the cylindrical wall 30 section may have a generally elliptical cross-section.

The thickness of the cylindrical wall 30 may range from about 0.5 mm (about 0.02 inches) to about 2.5 mm (about 0.1 inches). For example, the thickness may range from about 0.8 mm (about 0.03 inches) to about 1.3 mm (about 0.05 inches). In yet another example, the thickness of the cylindrical wall 30 may be about 1 mm (about 0.04 inches).

The conically-shaped wall 20 has a first length (L1) extending from the narrow end 24 to the wide end 22. The cylindrical wall 30 has a second length (L2). According to one embodiment, the ratio of the first length to the second length (L1/L2) ranges between about 12.5 to about 22.5. For example, the L1 may be about 140 mm (about 5.5 inches) and L2 may be about 8 mm (about 0.3 inches), which provides an L1/L2 ratio of about 17.5.

Optionally, one or more external fins 40 may be present on the outer surface of the conically-shaped wall 20, the cylindrical wall 30 or both. The external fins 40 may affect the motion of the conical diverter 12 as it is pulled through the water. For example, the external fins 40 may be configured to stabilize the conical diverter 12 to minimize its rotation or configured to promote rotation.

Figure 6:
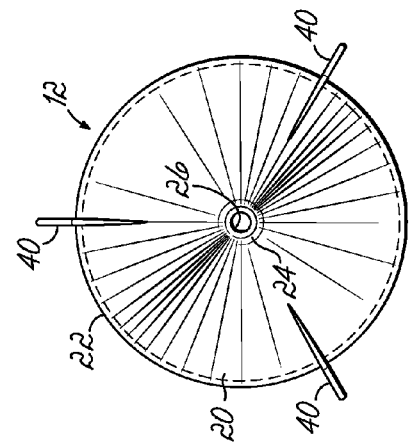
FIG. 6 is an end view taken from the narrow end of the conical diverter shown in FIG. 5.
Figure 5:
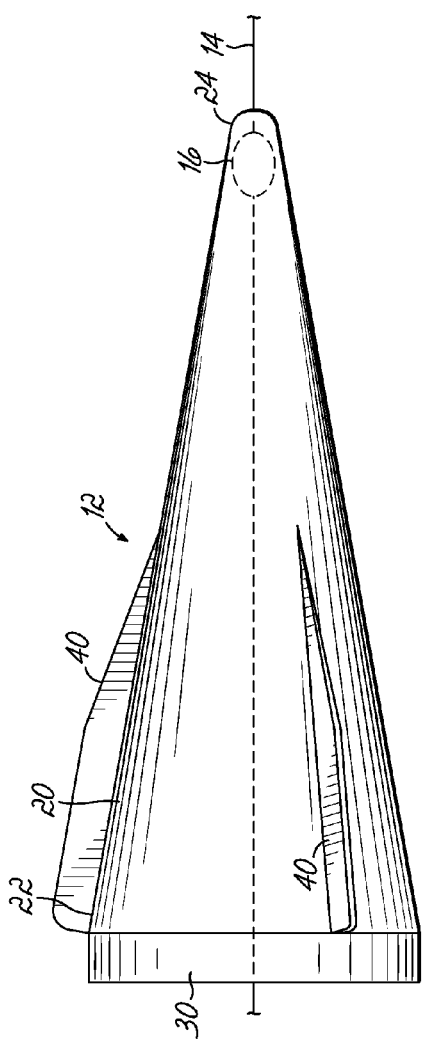
FIG. 5 is a side elevational view of a conical diverter according to another embodiment of the invention.
Figure 10:
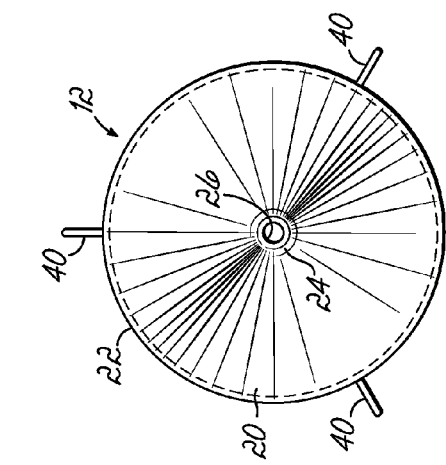
FIG. 10 is an end view taken from the narrow end of the conical diverter shown in FIG. 9.
Figure 9:
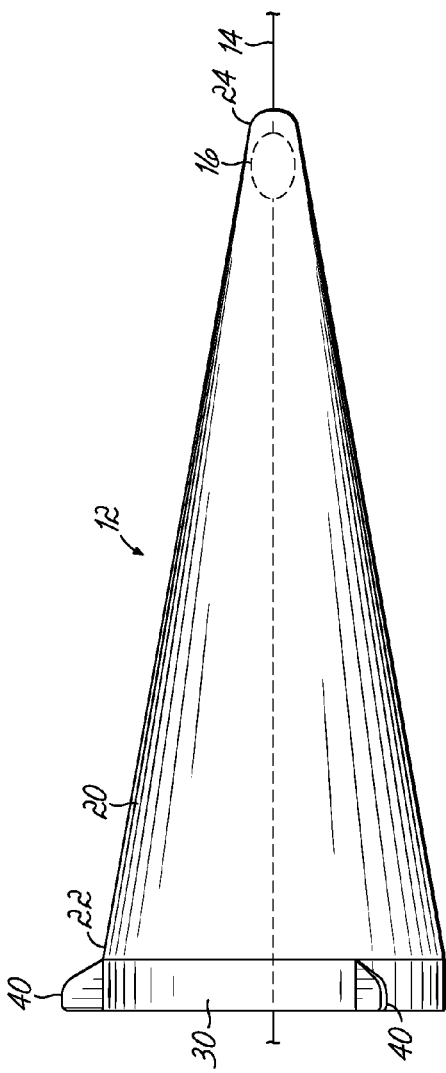
FIG. 9 is a side elevational view of a conical diverter according to another embodiment of the invention.

FIG. 6 provides a perspective view of an embodiment from the narrow end 24, wherein imaginary lines are shown that extend radially from the aperture 26 in the narrow end 24 toward the wide end 22. FIG. 5 depicts a side elevational view of the embodiment shown in FIG. 6, which provides another perspective of the external fins 40 positioned generally along the imaginary radial lines. Applicants have found that positioning the external fins 40 in this manner substantially minimizes any rotational force on the conical diverter 12 as it is pulled through the water. FIGS. 9 and 10 show the external fins positioned on the cylindrical wall 30 of the conical diverter 12.

Figure 8:
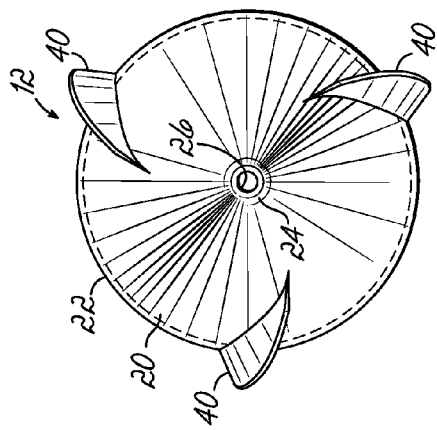
FIG. 8 is an end view taken from the narrow end of the conical diverter shown in FIG. 7.
Figure 7:
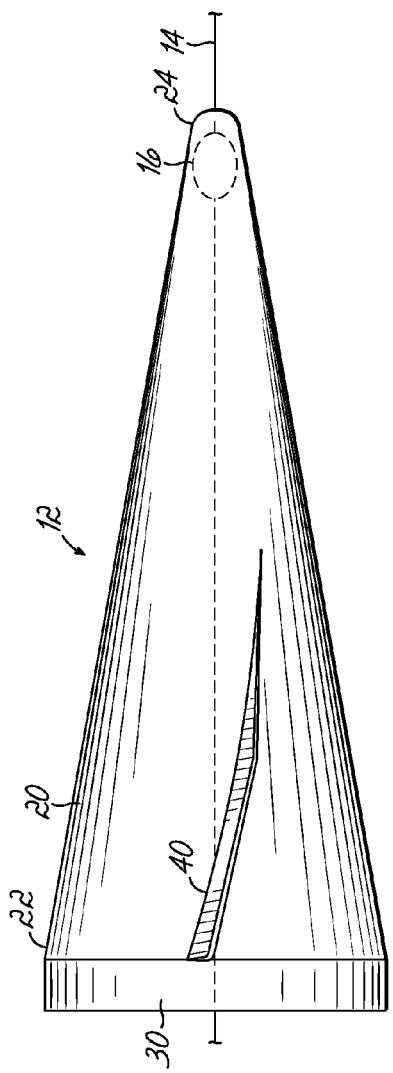
FIG. 7 is a side elevational view of a conical diverter according to another embodiment of the invention.

In an alternative embodiment, as shown in FIGS. 7 and 8, at least one external fin is angled relative to an imaginary radial line which extends from the aperture 26 in the narrow end 24 toward the wide end 22, thereby imparting a rotational force on the conical diverter 12 as it is pulled through the water.

In yet another embodiment, not shown, at least two external fins are angled relative to two different imaginary radial lines, albeit in opposing directions, to provide countering rotational forces with varying net rotational effects upon the conical diverter 12 as it is pulled through the water.

The fixture 16 may be any article that may be fastened to the line 14. Exemplary fixtures include, but are not limited to, sinkers and swivels. Direct or indirect fastening of the fixture 16 can be achieved by any suitable means known in the art, such as by tying, clamping, hooking, latching or wrapping.

The hooking device 18 may be any number of articles having at least one hook. As will be understood by those of ordinary skill in the art, the hooking device 18, and example of which is shown in FIG. 1, can be of any suitable size, shape, or color. The hooking device 18 may also be constructed of any suitable material such as wood, metal, plastic, rubber, elastomeric polymers, and the like which are well known by those of skill in the art. In addition, the hooking device 18 can comprise additional features not illustrated in the figures, such as a multitude of feeding attractant fill compositions. In addition, the hooking device 18 may be segmented, for example, and comprise a hinged segment such that the hooking device 18 demonstrates a more "life-like" motion when pulled though the water. Exemplary hooking devices include, but are not limited to lures, spinners, fishing hooks, or plugs. The hooking device 18 may comprise single, double, treble or multi-barb hooks.

In one embodiment of the invention, the fishing rig 10 comprises a line 14, a conical diverter 12, a fixture 16 and a hooking device 18. The line 14 has a pole end, a hook end and the fixture 16 is fastened, directly or indirectly, to the line between the pole end and the hook end. The hook end of the line 14 is fastened to a hooking device 18. The pole end of the line passes through the aperture 26 and is optionally fastened to a fishing reel. Optionally, the fishing rig 10 further comprises a fishing rod adapted to mount the fishing reel to the fishing rod.

The hooking device 18 is sufficiently spaced apart from the wide end 22 of the conical diverter 12 to permit fish access to the hooking device, while still being protected by the desired diversion effect. For example, the spacing of the hooking device 18 from the wide end 22 may range from about 25 mm (about 1 inch) to about 600 mm (24 inches); from about 50 mm (2 inches) to about 500 mm (20 inches); or from about 100 mm (4 inches) to about 400 mm (16 inches).

Applicant has unexpectedly found that the inclusion of a cylindrical wall 30 section that is contiguous with and extends from the conically-shaped wall 20 section minimizes water turbulence following the conical diverter 12 as it is pulled through the water ahead of and spaced from the hooking device 18. It is noteworthy that excessive turbulence may effectually negate the diversion effect created by the conical diverter 12. Therefore, the length (L2) of the cylindrical wall 30 should be long enough, relative to the length (L1) of the conically-shaped wall 20, to sufficiently minimize the turbulence so as to not negate the diversion effect. Accordingly, in one embodiment, the ratio of the first length to the second length (L1/L2) ranges between about 12.5 to about 22.5. For example, the L1 may be about 140 mm (about 5.5 inches) and L2 may be about 8 mm (about 0.3 inches), which provides an L1/L2 ratio of about 17.5.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A fishing diverter attachable to a fishing line, the fishing diverter comprising:
   a conical wall having a narrow end and a wide end, wherein the conical wall has a first length (L1) extending from the narrow end to the wide end, and wherein the narrow end defines an aperture for receiving the fishing line therethrough; and
   a cylindrical wall extending from the wide end of the conical wall, wherein the cylindrical wall has a second length (L2), wherein the ratio of the first length to the second length (L1/L2) ranges between about 12.5 and about 22.5, and wherein the ratio of the first length to the second length (L1/L2) creates a diversion effect that substantially reduces water turbulence following the fishing diverter when the fishing diverter is pulled through water with the fishing line.

2. The fishing diverter of claim 1, wherein the narrow end of the conical wall is configured to engage a fixture attached to the fishing line when the fishing diverter is pulled through water with the fishing line.

3. The fishing diverter of claim 1, wherein when the fishing diverter is pulled through water in a first direction, the narrow end of the conical wall is configured to engage a fixture attached to the fishing line to substantially prevent the fishing diverter from traversing the fishing line in a second direction opposite the first direction.

4. The fishing diverter of claim 1, wherein the conical diverter is comprised of a polymer or elastomer.

5. The fishing diverter of claim 1, wherein the conical wall has a cone angle ranging from about 15 degrees to about to 40 degrees.

6. The fishing diverter of claim 1, wherein at least one of the conical wall and the cylindrical wall includes at least one fin extending therefrom.

7. The fishing diverter of claim 1, wherein the conical wall includes a frusto-conical portion having a generally cylindrical channel longitudinally extending therethrough to define the aperture.

8. The fishing diverter of claim 7, wherein the frusto-conical portion is configured to engage a fixture attached to the fishing line when the fishing diverter is pulled through water with the fishing line.

9. The fishing diverter of claim 7, wherein when the fishing diverter is pulled through water in a first direction, the frusto-conical portion is configured to engage a fixture attached to the fishing line to substantially prevent the fishing diverter from traversing the fishing line in a second direction opposite the first direction.

10. A fishing diverter attachable to a fishing line, the fishing diverter comprising:
    a conical wall having a narrow end and a wide end, wherein the conical wall has a first length (L1) extending from the narrow end to the wide end, and wherein the narrow end includes a frusto-conical portion having a generally cylindrical channel which defines an aperture for receiving the fishing line therethrough; and
    a cylindrical wall extending from the wide end of the conical wall, wherein the cylindrical wall has a second length (L2), wherein the ratio of the first length to the second length (L1/L2) ranges between about 12.5 and about 22.5, and wherein the ratio of the first length to the second length (L1/L2) creates a diversion effect that substantially reduces water turbulence following the fishing diverter when the fishing diverter is pulled through water with the fishing line.

11. The fishing diverter of claim 10, wherein the frusto-conical portion is configured to engage a fixture attached to the fishing line when the fishing diverter is pulled through water with the fishing line.

12. The fishing diverter of claim 10, wherein when the fishing diverter is pulled through water in a first direction, the frusto-conical portion is configured to engage a fixture attached to the fishing line to substantially prevent the fishing diverter from traversing the fishing line in a second direction opposite the first direction.

13. The fishing diverter of claim 10, wherein the conical diverter is comprised of a polymer or elastomer.

14. The fishing diverter of claim 10, wherein the conical wall has a cone angle ranging from about 15 degrees to about to 40 degrees.

15. The fishing diverter of claim 10, wherein at least one of the conical wall and the cylindrical wall includes at least one fin extending therefrom.

16. A fishing method comprising:
    providing a fishing diverter attachable to a fishing line, the fishing diverter including:
    a conical wall having a narrow end and a wide end, and a cylindrical wall extending from the wide end of the conical wall, wherein the conical wall has a first length (L1) extending from the narrow end to the wide end, wherein the narrow end defines an aperture for receiving the fishing line therethrough, wherein the cylindrical wall has a second length (L2), wherein the ratio of the first length to the second length (L1/L2) ranges between about 12.5 and about 22.5, and wherein the ratio of the first length to the second length (L1/L2) creates a diversion effect that substantially reduces water turbulence following the fishing diverter when the fishing diverter is pulled through water with the fishing line.

17. The fishing method of claim 16, wherein the narrow end of the conical wall is configured to engage a fixture attached to the fishing line when the fishing diverter is pulled through water with the fishing line.

18. The fishing method of claim 16, wherein when the fishing diverter is pulled through water in a first direction, the narrow end of the conical wall is configured to engage a fixture attached to the fishing line to prevent the fishing diverter from traversing the fishing line in a second direction opposite the first direction.

19. The fishing method of claim 16, wherein the narrow end of the conical wall includes a frusto-conical portion having a generally cylindrical channel longitudinally extending therethrough to define the aperture.

20. The fishing method of claim 16, wherein the conical wall has a cone angle ranging from about 15 degrees to about to 40 degrees.

* * * * *